United States Patent
Weibel

(10) Patent No.: US 8,075,688 B2
(45) Date of Patent: Dec. 13, 2011

(54) AQUEOUS ACCELERATOR MIXTURE

(75) Inventor: Martin Weibel, Zurich (CH)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 12/811,777

(22) PCT Filed: Dec. 4, 2008

(86) PCT No.: PCT/EP2008/066794
§ 371 (c)(1),
(2), (4) Date: Jul. 28, 2010

(87) PCT Pub. No.: WO2009/086998
PCT Pub. Date: Jul. 16, 2009

(65) Prior Publication Data
US 2011/0197792 A1    Aug. 18, 2011

(30) Foreign Application Priority Data
Jan. 11, 2008   (EP) .................................... 08100355

(51) Int. Cl.
*C04B 28/02* (2006.01)
*C04B 40/00* (2006.01)

(52) U.S. Cl. ........ 106/801; 106/808; 106/815; 106/819; 106/823; 427/421.1; 427/427

(58) Field of Classification Search ................. 106/801, 106/808, 819, 823, 815; 427/421.1, 427; 428/703
See application file for complete search history.

(56) References Cited

U.S. PATENT DOCUMENTS

| | | | |
|---|---|---|---|
| 5,935,318 A | 8/1999 | Angelskaar et al. | |
| 6,537,367 B2 * | 3/2003 | Sommer et al. | 106/724 |
| 6,723,163 B1 | 4/2004 | Hofmann | |
| 7,182,808 B2 | 2/2007 | Angelskaar et al. | |
| 7,198,669 B2 | 4/2007 | Angelskaar et al. | |
| 7,470,317 B2 | 12/2008 | Lunkenheimer et al. | |
| 7,662,230 B2 | 2/2010 | Angelskaar et al. | |
| 2002/0035952 A1 | 3/2002 | Sommer et al. | |
| 2006/0048685 A1 | 3/2006 | Angelskaar et al. | |
| 2006/0249055 A1 | 11/2006 | Lunkenheimer et al. | |
| 2007/0044686 A1 | 3/2007 | Angelskaar et al. | |
| 2007/0056473 A1 | 3/2007 | Nakashima et al. | |
| 2008/0090016 A1 | 4/2008 | Angelskar et al. | |

FOREIGN PATENT DOCUMENTS

| | | |
|---|---|---|
| EP | 0812812 A1 | 12/1997 |
| EP | 812812 A1 * | 12/1997 |
| EP | 1167317 A1 | 1/2002 |
| EP | 0812812 B1 | 1/2003 |
| EP | 1114004 B1 | 6/2003 |
| EP | 1676820 A1 | 7/2006 |
| JP | 2008-030999 A1 * | 2/2008 |
| WO | WO 03/106375 A1 | 12/2003 |
| WO | WO 2004/018380 A2 | 3/2004 |
| WO | WO 2004/076382 A1 | 9/2004 |
| WO | WO 2005/028398 A1 | 3/2005 |
| WO | WO 2005/040059 A2 | 5/2005 |
| WO | WO 2006/010407 A1 | 2/2006 |
| WO | WO 2006/074739 A1 | 7/2006 |
| WO | WO 2007/022852 A2 | 3/2007 |

OTHER PUBLICATIONS

PCT/EP2008/066794—Written Opinion of the International Searching Authority, Apr. 15, 2009.
PCT/CH2008/066794—International Search Report, Apr. 15, 2009.

* cited by examiner

*Primary Examiner* — Anthony Green
(74) *Attorney, Agent, or Firm* — Curatolo Sidoti Co., LPA; Joseph G. Curatolo Curatolo; Salvatore A. Sidoti

(57) ABSTRACT

The invention relates to an accelerator, preferably for sprayed concrete or sprayed mortar, which is present as an aqueous mixture, preferably dispersion, particularly preferably suspension, which contains the following:
(a) aluminium in oxidation state 3,
(b) sulphate,
(c) fluoride, and/or (semi)metal fluoro complexes,
(d) stabiliser, preferably inorganic stabiliser, particularly preferably magnesium silicate and/or kaolin and/or clay minerals and/or allophane, in particular magnesium silicate and/or bentonite, particularly preferably sepiolite, especially particularly preferably $Si_{12}Mg_8O_{30}(OH)_4(OH_2)_4$ and/or $Mg_4Si_6O_{15}(OH)_2$.

27 Claims, No Drawings

AQUEOUS ACCELERATOR MIXTURE

CROSS REFERENCE TO RELATED APPLICATIONS

This application is a national stage application of International Application No. PCT/EP2008/066794, filed 4 Dec. 2008, which claims priority from European Patent Application Serial No. 08 100 355.0, filed 11 Jan. 2008, from which applications priority is claimed, and which are incorporated herein by reference.

The invention relates to an accelerator for concrete or mortar, preferably for sprayed concrete or sprayed mortar, which is present as an aqueous mixture, preferably dispersion, particularly preferably suspension, which contains the following:
(a) aluminium in oxidation state 3,
(b) sulphate,
(c) fluoride and/or (semi)metal fluoro complexes,
(d) stabiliser, preferably inorganic stabiliser, particularly preferably magnesium silicate and/or kaolin and/or clay minerals and/or allophane, in particular magnesium silicate and/or bentonite, particularly preferably sepiolite, especially particularly preferably $Si_{12}Mg_8O_{30}(OH)_4(OH_2)_4$ and/or $Mg_4Si_6O_{15}(OH)_2$.

The invention furthermore relates to a process for the preparation of the accelerator according to the invention, aluminium sulphate, preferably amorphous aluminium hydroxide, hydrofluoric acid and/or fluoride-containing, preferably water-soluble salts and/or (semi)metal fluoro complexes, magnesium silicate and amine being mixed with water. The invention also relates to the use of the accelerator according to the invention in the coating of substrates, preferably tunnel surfaces, mine surfaces, construction trenches or shafts, with sprayed concrete or sprayed mortar and the hardened layers prepared thereby, which are produced by applying sprayed concrete and sprayed mortar, the hardening of which was forced with the accelerator according to the invention.

Sprayed concrete and sprayed mortar which is applied to substrates, such as rock surfaces of tunnels, must set and harden rapidly so that the adhesion and mechanical strength thereof and hence the safety for humans and machines are ensured. For this reason, accelerators which ensure rapid hardening are added to the sprayed concrete or sprayed mortar.

Accelerator solutions are described in EP-A 1 114 004, WO 2006/010407, EP-A 812 812, WO 2005/040059, WO 2007/022852, WO 2006/074739, WO 2005/028398, WO 03/106375, WO 2004/076382 and EP-A 1167317.

Conventional usually alkali-free setting accelerators for sprayed concrete and other cement-containing materials are distinguished in that they either result in rapid setting and relatively low early strength or lead to slow setting in combination with relatively high early strength.

Starting from the prior art, it was the object of the present invention to develop an accelerator by means of which good early strength is permitted in combination with optimised setting time. In addition, the accelerator should have good stability of the aqueous solution or of the dispersion. Separation or precipitation of the dissolved or suspended constituents would be very disadvantageous since a constant quality of the accelerators cannot be ensured under these circumstances.

This object could be achieved by the aqueous accelerators described at the outset, the process for their preparation, the use thereof and the products obtainable therewith.

The aqueous mixture according to the invention may be solutions, dispersions or suspensions; dispersions are preferred and suspensions are particularly preferred.

The accelerator according to the invention can preferably be prepared by mixing aluminium sulphate, hydrofluoric acid and preferably amorphous aluminium hydroxide with water. The hydrofluoric acid may be completely or partly replaced by fluoride-containing, preferably water-soluble salts, such as, for example, NaF, KF and/or $MgF_2$. It is also possible to use (semi)metal fluoro complexes, such as, for example, $FeF_3$, $ZrF_4$, $BF_3$, $PF_5$, $Na_3[AlF_6]$, $K_2[TiF_6]$ and/or tetrafluoroborates, such as, for example, sodium tetrafluoroborate or $H[BF_4]$. The term (semi)metal fluoro complexes is to be understood as meaning semimetal fluoro complexes and/or metal fluoro complexes, the semimetal fluoro complexes being preferred to the metal fluoro complexes. Hydrofluoric acid is particular preferred and the fluoride-containing salts are preferred to the (semi)metal fluoro complexes. $PF_5$ is least preferred.

The fluorine sources hydrofluoric acid, fluoride salts, semimetal fluoro complexes and/or metal fluoro complexes are therefore available. It is possible to use all these fluorine sources or only individual fluorine sources from among these fluorine sources or all possible combinations. The accelerators according to the invention are preferably alkali-free accelerators. For clarification, it should also be mentioned that elemental fluorine cannot be used in this invention.

The preparation of the accelerator mixtures is preferably effected at a temperature between 40 and 80° C., particularly preferably at a temperature between 50 and 70° C. The aluminium sulphate added to the aqueous accelerator mixture can accordingly be present partly in dispersed form and partly in dissolved form. Frequently, at least a proportion of the aluminium sulphate reacts with other components of the dispersion (for example with preferably amorphous aluminium hydroxide and/or with the hydrofluoric acid) with formation of complicated aluminium complexes. Thus, as a rule at least a portion of the dissolved aluminium sulphate is present in the form of these complex structures.

A stabiliser is present in the accelerator mixture according to the invention. The stabiliser inhibits or prevents the sedimentation of dispersed particles of the accelerator according to the invention. Particularly preferably, the dispersion according to the invention contains the inorganic stabiliser in a proportion of between 0.1 and 10% by weight, based on the total weight of the aqueous mixture. Even more preferred stabiliser contents are in the range from 0.2 to 3% by weight and especially in the range from 0.3 to 1.3% by weight, based in each case on the total weight of the accelerator mixture.

As already described at the outset, suitable stabilisers are preferably inorganic stabilisers, for example certain silicates, clay minerals, kaolins, allophanes and very generally inert thixotropic substances. Preferred stabilisers are magnesium silicate and/or bentonite and/or allophane. Sepiolite is particularly preferred, especially particularly preferably $Si_{12}Mg_8O_{30}(OH)_4(OH_2)_4$ and/or $Mg_4Si_6O_{15}(OH)_2$.

Sepiolite is to be understood as meaning a hydrated magnesium silicate which can be defined by the empirical formula $$Si_{12}Mg_8O_{30}(OH)_4(OH_2)_4.8H_2O$$

or by $Mg_4Si_5O_{15}(OH)_2.6H_2O.$

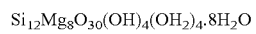

The sepiolite is preferably composed of 2 layers of tetrahedral silica which are linked via oxygen atoms to an octahedral, discontinuous middle layer comprising magnesium atoms. This structure imparts a microfibre-like morphology to the sepiolite particles. A plurality of suitable products of inorganic stabilisers which are suitable for the present invention and comprise sepiolite are commercially available—for example "Pangel" from Tolsa. Pangel is a rheological additive which is obtained from sepiolite by loosening the fibre bundles and detaching the particles without destroying the particular, elongated shape thereof.

An example of stabilisers based on bentonite is Tixoton® from Süd-Chemie.

By definition, the inorganic stabilisers suitable for the invention are particularly preferably also to be understood as meaning products which are obtained by modification measures directly from the particularly preferred sepiolite as such, such as, for example, said "Pangel", the modification measures at least substantially retaining the elongated shape of the sepiolite particles. The modification measures meant in this context preferably relate to the loosening of sepiolite as such and measures for detaching sepiolite particles. An example of such a modification measure is the wet milling of sepiolite as such.

Other preferred accelerators are those which contain (e) amine in the mixture. Particularly preferably, at least one alkanolamine may be present in the mixture. Diethanolamine and/or triethanolamine are particularly preferred as the amine, especially particularly preferably'diethanolamine.

According to the invention, the combination of high sulphate contents, which are preferably present in the form of a dispersion, with low proportions of fluorine from fluoride and/or (semi)metal fluoro complexes, preferably fluoride, particularly preferably hydrofluoric acid, is particularly preferred. Reference is made in each case to proportions by weight.

An accelerator which contains in aqueous mixture:
(a) preferably between 4 and 10% by weight,
    particularly preferably between 5 and 9% by weight and especially preferably between 6 and 8% by weight of aluminium in oxidation state 3,
(b) preferably between 20 and 34% by weight,
    particularly preferably between 24 and 32% by weight and especially preferably between 27 and 30% by weight of sulphate,
(c) a fluorine proportion from fluoride and/or (semi)metal fluoro complexes,
    preferably as fluoride,
    of preferably between 0.1 and 3% by weight,
    particularly preferably between 0.1 and 2% by weight,
    in particular between 0.1 and 1% by weight,
    especially preferably between 0.2 and 0.5 by weight, based in each case on the total weight of the aqueous mixture,
    is therefore preferred.

An accelerator which contains in aqueous mixture:
(a) between 6 and 8% by weight of aluminium in oxidation state 3,
(b) between 27 and 30% by weight of sulphate,
(c) a fluorine proportion from fluoride and/or (semi)metal fluoro complexes,
    preferably as fluoride,
    of between 0.1 and 1% by weight, particularly preferably between 0.2 and 0.5% by weight,
based in each case on the total weight of the aqueous mixture, is particularly preferred.

The weight data are based on the weight of the aluminium ions with respect to the aluminium, on the weight of the sulphate with respect to the sulphate and on the weight of the fluoride with respect to the fluoride, or on the corresponding proportion by weight of fluorine in the case of (semi)metal fluoro complexes. Counterions are not taken into account in these weight data.

The accelerators according to the invention with the preferred quantity data described are distinguished in that these accelerators permit the achievement of good early strength in combination with optimised (relatively short) setting times, at the same time the shelf-life being good and the production costs advantageous. For example, by using relatively small amounts of hydrofluoric acid and/or fluoride-containing, preferably water-soluble salts and/or (semi)metal fluoro complexes, a cost saving can be achieved in comparison with products with larger amounts of fluoride-containing additives. Another characteristic is the unusual range of different cements which give good spray results with this accelerator. These are not only cements which are relatively easy to accelerate and for which satisfactory results are also achieved with conventional accelerators. They are in particular also particularly sluggish or incompatible cements for which no sufficiently effective accelerators have been known to date.

The accelerators according to the invention, preferably in dispersion form, preferably have a substantially higher sulphate content and a substantially lower content of fluorine from fluoride and/or (semi)metal fluoro complexes, preferably fluoride, than the conventional fluoride-containing accelerators in solution form. If a high sulphate content is combined with a high content of fluorine, or fluoride, the setting times are even shorter but the strength development is too slow.

With the accelerator according to the invention, it is now possible for the first time to achieve rapid setting, as is usual for fluoride-containing accelerators, with a markedly high early strength (e.g. 6 hours after spraying).

A preferred accelerator is one which contains in aqueous mixture, in addition to (a), (b) and (c):
(d) between 0.1 and 10% by weight,
    particularly preferably between 0.2 and 3% by weight,
    especially preferably between 0.3 and 1.3% by weight, of stabiliser, preferably magnesium silicate, particularly preferably sepiolite,
(e) between 0 and 20% by weight, particularly preferably between 1 and 8% by weight, especially preferably between 2 and 5% by weight, of amine, preferably alkanolamine, particularly preferably diethanolamine and/or triethanolamine, in particular diethanolamine,
based in each case on the total weight of the aqueous mixture.

Aqueous accelerator mixtures in which the molar ratio of aluminium to sulphate in the mixture is between 1.3:1 and 0.7:1 and the accelerator contains 24 to 40% by weight of aluminium sulphate, based on the total weight of the aqueous solution, are preferred. Accelerators whose molar ratio of aluminium to sulphate in the mixture is between 1:1 and 0.8:1 and where the accelerator contains 30 to 36% by weight of aluminium sulphate, based on the total weight of the aqueous mixture, are particularly preferred.

The accelerators according to the invention preferably have a proportion by weight of fluorine from fluoride and/or (semi)metal fluoro complexes, preferably as fluoride, of between 0.1 and 1% by weight, particularly preferably between 0.2 and 0.5% by weight, based in each case on the total weight of the aqueous mixture.

As already described at the outset, the mixture may be present as a solution, dispersion or suspension, preferably as a dispersion, particularly preferably as a suspension.

The present invention also relates to a process for the preparation of an accelerator, preferably for sprayed concrete or sprayed mortar, which is present as an aqueous mixture, characterized in that aluminium sulphate, aluminium hydroxide (preferably amorphous aluminium hydroxide), hydrofluoric acid and/or fluoride-containing salts and/or (semi)metal fluoro complexes and magnesium silicate are mixed with water. Amine can also preferably be admixed. Hydrofluoric acid may be completely or partly replaced by the abovementioned fluorine sources. It is possible to use all or only individual ones of the three abovementioned fluorine sources, or all possible combinations. In particular, the initially described accelerator mixtures according to the invention are prepared by the process according to the invention.

The process according to the invention can preferably be effected by a procedure in which
between 28 and 38% by weight, particularly preferably between 32 and 36% by weight, of aluminium sulphate,
between 2 and 8% by weight, particularly preferably between 3 and 6% by weight, of preferably amorphous aluminium hydroxide,
between 0.2 and 3% by weight, particularly preferably between 0.3 and 1.3% by weight, of magnesium silicate, particularly preferably sepiolite, in particular $Si_{12}Mg_8O_{30}(OH)_4(OH_2)_4 \cdot 8(H_2O)$ and/or $Mg_4Si_5O_{15}(OH)_2 \cdot 6(H_2O)$, between 0.1 and 2% by weight, preferably between 0.1 and 1% by weight, particularly preferably between 0.2 and 0.5% by weight, of fluorine or fluoride from a fluorine-containing substance selected from the group consisting of hydrofluoric acid and/or fluoride-containing salts and/or (semi)metal fluoro complexes, particularly preferably water-soluble fluoride-containing salts, especially preferably hydrofluoric acid, optionally between 1 and 8% by weight, preferably between 2 and 5% by weight, of alkanolamine, especially preferably between 2 and 5% by weight of diethanolamine, are mixed with water, the weight data being based on the total weight of the accelerator.

During the preparation and during the storage, the accelerators according to the invention preferably have a pH of between 0 and 5, most preferably a pH of between 2 and 3.5. The various components can preferably be added with vigorous stirring to the initially introduced water or an initially introduced solution of one of the accelerator components. In order to obtain solutions, the procedure is preferably effected with heating of the mixtures. Heating and also subsequent cooling are not absolutely essential, with the result that energy costs can be saved and the preparation is simplified. However, heating to temperatures between 40 and 80° C. advantageously reduces the preparation time and therefore increases the productivity of the production plant.

The invention furthermore relates to the use of the accelerator described above in the coating of substrates, in particular of tunnel surfaces, mine surfaces, construction trenches and shafts, with concrete or mortar, especially preferably in a spraying process.

Typically, from 5 to 10 kg of the accelerator according to the invention are used in practice per 100 kg of cement.

The invention furthermore relates to a hardened layer of concrete or mortar which was produced by applying concrete or mortar, preferably sprayed concrete or sprayed mortar, the hardening of which was forced with an accelerator described above.

Below, the present invention is to be explained in more detail with reference to working examples:

The examples of accelerators according to the invention which are mentioned were prepared as follows. The required amount of cold water was placed in a beaker on an electrical hotplate and vigorously stirred with a propeller stirrer. During the heating, first the magnesium silicate, then the aluminium sulphate and finally, in any desired sequence, the remaining constituents were added. The water content of the raw materials used was taken into account in calculating the water required at the beginning. After reaching 60° C., the accelerator was stirred for a further two hours at this temperature and then slowly cooled to room temperature for several hours with continued stirring. On the next day, the accelerator was vigorously stirred again. The sequence of addition of the raw materials can influence the duration of stirring which is required in order to obtain a homogeneous product but have no influence on the properties of the completely reacted and correctly stirred accelerator.

The accelerators according to the invention and the comparative examples were tested with regard to the setting time and the compressive strength with mortar according to DIN EN 196-1 and -3.

1. Experiments with hydrofluoric acid accelerators

Mortar

Cement: 450 g

Plasticizer: 0.2% by weight of Glenium® 51 (based on cement)

Sand: 1350 g of CEN standard sand

Water/cement value (W/C): 0.45

The addition of the accelerator was effected in a proportion of 8% by weight, based on the cement weight. For practical reasons (availability, solubility, aggregate state), the starting materials stated in the tables below were used as a rule not in 100% pure form but with a certain water content.

|  |  | Comp. 1 | Accel. A | Accel. B | Comp. 2 |
|---|---|---|---|---|---|
| Composition |  |  |  |  |  |
| Water | 100% | 58.6 | 55.0 | 56.4 | 63.8 |
| Sepiolite | 100% | 0.8 | 0.8 | 0.8 |  |
| $Al_2(SO_4)_3$ (aluminium sulphate) | 100% | 34.0 | 34.0 | 33.1 | 25.3 |
| $Al(OH)_3$ (aluminium hydroxide)* | 100% | 3.0 | 5.3 | 4.5 | 6.8 |
| Diethanolamine | 100% | 3.6 | 4.5 | 3.6 | 0.5 |
| HF (hydrofluoric acid) | 100% |  | 0.4 | 1.6 | 3.6 |
| Mortar experiments Untervaz CEM I 42.5N (Switzerland) |  |  |  |  |  |
| Start of setting | (minutes) | 4.5 | 2.5 | 1.5 | 1.5 |
| End of setting | (minutes) | 17.0 | 8.0 | 5.5 | 4.0 |
| Compressive strength after 6 h | (MPa) | 2.7 | 3.9 | 1.3 | 1.1 |
| Compressive strength after 1 day | (MPa) | 23.5 | 19.9 | 22.8 | 18.8 |
| Compressive strength after 7 days | (MPa) | 44.7 | 42.0 | 38.8 | 42.1 |
| Mortar experiments Göltas CEM (Turkey) |  |  |  |  |  |
| Start of setting | (minutes) | 3.0 | 2.0 | 1.5 | 1.5 |
| End of setting | (minutes) | 17.0 | 7.0 | 6.5 | 7.0 |
| Compressive strength after 6 h | (MPa) | 3.9 | 2.0 | 0.7 | 0.5 |
| Compressive strength after 1 day | (MPa) | 23.9 | 20.7 | 20.3 | 14.3 |
| Compressive strength after 7 days | (MPa) | 45.2 | 40.6 | 35.8 | 38.6 |
| Mortar experiments Alpena US Type I CEM (USA) |  |  |  |  |  |
| Start of setting | (minutes) | 4.0 | 1.5 | 1.5 | 1.5 |
| End of setting | (minutes) | 21.0 | 6.0 | 8.5 | 6.0 |

-continued

|  |  | Comp. 1 | Accel. A | Accel. B | Comp. 2 |
|---|---|---|---|---|---|
| Compressive strength after 6 h | (MPa) | 8.4 | 4.7 | 1.6 | 0.2 |
| Compressive strength after 1 day | (MPa) | 32.2 | 22.5 | 20.3 | 11.3 |
| Compressive strength after 7 days | (MPa) | 56.0 | 40.1 | 46.5 | 33.8 |

*In amorphous form.

All three cements (Untervaz, Göltas and Alpena) from three different continents showed faster setting with increasing fluoride content.

The compressive strength after 6 hours shows different behaviour. It is as a rule highest in the case of comparative example 1 without fluoride, followed by accelerator A according to the invention with a particularly preferred fluoride content of about 0.4%. However, even in the case of accelerator B with about 1.6%, which accelerator is not particularly preferred, it is still substantially higher than in the case of comparative example 2 with about 3.6% of fluoride.

In the case of comparative example 2, the compressive strengths after even 1 day for two of three cements (Göltas and Alpena) lag substantially behind the accelerators according to the invention. In the case of Alpena cement, this is the case even after 7 days.

In contrast to the two comparative examples 1 and 2, the especially preferred accelerator A according to the invention with its rapid setting and its high early strength meets all requirements with regard to an efficient, cement-independent accelerator.

In order to obtain clarity about the threshold value from which the early strength falls into the known low range (<1 MPa after 6 h) of the comparative examples with a large amount of hydrofluoric acid, further accelerators according to the invention and cements were tested.

Both cements showed a continuous decrease of start of setting and end of setting and also a continuous decrease of early strength with increasing fluoride content within the scatters customary for such experiments.

Siggenthal cement is very tolerant. Although the setting times are halved with about 1.2% of fluoride (accelerator G), the early strength decreases only insignificantly to 2.5 MPa. Only at about 3.6% of fluoride (comparative example 4) does it decrease, with 1.1 MPa, to a fraction of the accelerators C to G and of the fluoride-free comparative example 3.

In contrast, Embra Mil 70 cement is a cement which is difficult to accelerate. Small amounts of fluoride (0.2-0.6%), as present in accelerators C to E, reduce the setting times only slightly, although the compressive strength after 6 h decreases substantially. Only large amounts of fluoride, as present in comparative example 5 with 2.8% of hydrofluoric acid, reduce the end of setting below 10 min. However, the compressive strengths after 6 and 24 h decrease to ⅐ of the especially preferred accelerators C and D according to the invention. In contrast to these, however, comparative example 5 cannot be used with this cement in tunnel construction.

In a last series of accelerators according to the invention, it is intended to show how the efficiency of the accelerators can be further improved with optimisation of constituents other than hydrofluoric acid.

| Composition |  | Comp. 3 | Accel. C | Accel. D | Accel. E | Accel. F | Accel. G | Comp. 4 | Comp. 5 |
|---|---|---|---|---|---|---|---|---|---|
| Water | 100% | 56.4 | 56.2 | 56.0 | 55.8 | 55.6 | 55.2 | 63.8 | 61.6 |
| Sepiolite | 100% | 0.8 | 0.8 | 0.8 | 0.8 | 0.8 | 0.8 |  |  |
| $Al_2(SO_4)_3$ (aluminium sulphate) | 100% | 34.7 | 34.7 | 34.7 | 34.7 | 34.7 | 34.7 | 25.3 | 23.1 |
| $Al(OH)_3$ (aluminium hydroxide)* | 100% | 4.5 | 4.5 | 4.5 | 4.5 | 4.5 | 4.5 | 6.8 | 12.0 |
| Diethanolamine | 100% | 3.6 | 3.6 | 3.6 | 3.6 | 3.6 | 3.6 | 0.5 | 0.5 |
| HF (Hydrofluoric acid) | 100% |  | 0.2 | 0.4 | 0.6 | 0.8 | 1.2 | 3.6 | 2.8 |

| Mortar experiments Siggenthal CEM I 42.5N (Switzerland) |  | Comp. 3 | Accel. C | Accel. D | Accel. E | Accel. F | Accel. G | Comp. 4 |
|---|---|---|---|---|---|---|---|---|
| Start of setting | (minutes) | 6.5 | 6.5 | 5.0 | 3.5 | 3.5 | 2.5 | 2.0 |
| End of setting | (minutes) | 15.0 | 18.0 | 15.0 | 12.0 | 11.0 | 8.0 | 6.5 |
| Compressive strength after 6 h | (MPa) | 3.8 | 2.8 | 2.7 | 2.2 | 2.4 | 2.5 | 1.1 |
| Compressive strength after 1 day | (MPa) | 23.1 | 23.3 | 19.4 | 21.2 | 18.1 | 20.0 | 18.3 |
| Compressive strength after 7 days | (MPa) | 50.1 | 48.7 | 45.5 | 44.5 | 43.5 | 46.5 | 47.9 |

| Mortar experiments Embra Mil 70 CEM (Norway) |  | Comp. 3 | Accel. C | Accel. D | Accel. E | Accel. F | Accel. G | Comp. 5 |
|---|---|---|---|---|---|---|---|---|
| Start of setting | (minutes) | 2.0 | 1.5 | 1.5 | 1.5 | 1.5 | 1.5 | 1.5 |
| End of setting | (minutes) | 21.0 | 21.0 | 24.0 | 20.0 | 20.0 | 16.0 | 2.0 |
| Compressive strength after 6 h | (MPa) | 2.3 | 1.4 | 1.4 | 1.1 | 0.7 | 0.5 | 0.2 |
| Compressive strength after 1 day | (MPa) | 16.7 | 16.2 | 15.0 | 15.1 | 15.2 | 12.9 | 2.0 |
| Compressive strength after 7 days | (MPa) | 41.1 | 39.2 | 38.0 | 36.8 | 41.1 | 43.8 | 30.6 |

*In amorphous form.

| Composition | | Comp. 6 | Accel. H | Accel. I | Accel. K | Accel. L | Accel. M | Comp. C |
|---|---|---|---|---|---|---|---|---|
| Water | 100% | 53.1 | 52.9 | 52.7 | 52.5 | 52.3 | 51.9 | 61.6 |
| Sepiolite | 100% | 0.8 | 0.8 | 0.8 | 0.8 | 0.8 | 0.8 | |
| $Al_2(SO_4)_3$ (aluminium sulphate) | 100% | 34.7 | 34.7 | 34.7 | 34.7 | 34.7 | 34.7 | 23.1 |
| $Al(OH)_3$ (aluminium hydroxide)* | 100% | 6.0 | 6.0 | 6.0 | 6.0 | 6.0 | 6.0 | 12.0 |
| Diethanolamine | 100% | 5.4 | 5.4 | 5.4 | 5.4 | 5.4 | 5.4 | 0.5 |
| HF (Hydrofluoric acid) | 100% | | 0.2 | 0.4 | 0.6 | 0.8 | 1.2 | 2.8 |
| Mortar experiments Embra Mil 70 CEM (Norway) | | Comp. 6 | Accel. H | Accel. I | Accel. K | Accel. L | Accel. M | Comp. 5 |
| Start of setting | (minutes) | 1.5 | 1.5 | 1.5 | 1.5 | 1.5 | 1.5 | 1.5 |
| End of setting | (minutes) | 17.0 | 13.0 | 13.0 | 14.0 | 11.0 | 11.0 | 2.0 |
| Compressive strength after 6 h | (MPa) | 1.6 | 1.4 | 1.0 | 0.6 | 0.6 | 0.4 | 0.2 |
| Compressive strength after 1 day | (MPa) | 13.2 | 13.9 | 14.1 | 11.9 | 10.2 | 6.0 | 2.0 |
| Compressive strength after 7 days | (MPa) | 34.1 | 33.5 | 33.3 | 33.0 | 27.7 | 22.7 | 30.6 |

*In amorphous form.

Comparative example 6 and the accelerators H to M according to the invention are identical to the preceding comparative example 3 and the accelerators C to G according to the invention, apart from the higher aluminium hydroxide and diethanolamine contents. While all other values remain about the same, the end of setting decreases to ⅔. The accelerators H and I with about 0.2 and 0.4% of fluoride, respectively, are the only ones to achieve with this cement values which are satisfactory for use in practice.

2. Experiments with Accelerators from Other Fluorides

In a further experimental series, sodium fluoride as a representative of the fluoride salts and some (semi)metal fluoro complexes were also investigated in addition to hydrofluoric acid. For the preparation of the accelerator dispersions and testing according to DIN EN 196-1 and -3, statements made in the introduction to the examples are applicable.

Mortar
Cement
Untervaz CEM 142.5 Normo 4: 450 g
Plasticizer: 0.3% by weight of Glenium® 51 (based on cement)
Sand: 1350 g of CEN standard sand
Water/cement value (WIC): 0.45

The addition of the accelerator was effected in a proportion of 9% by weight, based on the cement weight.

| | | E1 | E2 | E3 | E4 | E5 | E6 | E7 | E8 | Comp. 7 | Comp. 8 |
|---|---|---|---|---|---|---|---|---|---|---|---|
| Composition | | | | | | | | | | | |
| Water | 100% | 25.7 | 25.8 | 25.8 | 25.5 | 23.2 | 23.3 | 23.3 | 22.8 | 26.2 | 24.2 |
| Sepiolite | 100% | 0.8 | 0.8 | 0.8 | 0.8 | 0.8 | 0.8 | 0.8 | 0.8 | 0.8 | 0.8 |
| $Al_2(SO_4)_3$ (aluminium sulphate) | 100% | 34.2 | 34.2 | 34.2 | 34.2 | 34.2 | 34.2 | 34.2 | 34.2 | 34.2 | 34.2 |
| $Al(OH)_3$ (aluminium hydroxide)* | 100% | 4.5 | 4.5 | 4.5 | 4.5 | 6 | 6 | 6 | 6 | 4.5 | 6 |
| Diethanolamine | 100% | 3.6 | 3.6 | 3.6 | 3.6 | 3.6 | 3.6 | 3.6 | 3.6 | 3.6 | 3.6 |
| HF (Hydrofluoric acid**) | 100% | 0.2 | | | | 0.4 | | | | | |
| NaF | 100% | | 0.45 | | | | 0.9 | | | | |
| $HBF_4$ | 100% | | | 0.23 | | | | 0.45 | | | |
| $FeF_3 \cdot 3H_2O$ | 100% | | | | 0.7 | | | | 1.4 | | |
| Mortar experiments Untervaz CEM I 42.5 N | | | | | | | | | | | |
| Start of setting | (minutes) | 4.0 | 4.0 | 4.0 | 4.0 | 4.0 | 4.0 | 4.0 | 4.0 | 6.0 | 4.5 |
| End of setting | (minutes) | 28 | 23 | 24 | 24 | 23 | 20 | 20 | 17 | 26 | 25 |
| Compressive strength after 6 h | (MPa) | 2.4 | 2.5 | 2.3 | 2.0 | 3.0 | 2.4 | 2.7 | 2.6 | 2.5 | 3.2 |
| Compressive strength after 1 day | (MPa) | 17.0 | 15.2 | 16.8 | 18.4 | 14.7 | 15.9 | 12.6 | 12.4 | 19.5 | 17.7 |
| Compressive strength after 7 days | (MPa) | 41.5 | 40.5 | 38.5 | 41.0 | 42.1 | 42.0 | 41.4 | 38.8 | 41.1 | 44.1 |

*In amorphous form.

From the above table, it is evident that the use of hydrofluoric acid, sodium fluoride and the (semi)metal fluoro complexes $HBF_4$ and $FeF_3$-$3H_2O$ improve in particular the setting times in comparison with the comparative examples without fluorine. Similarly good results to the use of hydrofluoric acid are obtained.

The strengths after 6 hours or 1 day or 7 days are also similar, within the variation customary for such mortar experiments, to the examples according to the invention with hydrofluoric acid. It is found that the aim of shortening the setting times can be realized in combination with the good development of strength with the accelerators according to the invention.

The storage stability of the accelerators with sodium fluoride and of accelerators with (semi)metal fluoro complexes, such as $HBF_4$ and $FeF_3$-$3H_2O$ is similarly good to that in the case of hydrofluoric acid.

The invention claimed is:

1. Accelerator which is present as an aqueous mixture which contains the following:
   (a) between 4 and 10% by weight of aluminium in oxidation state 3,
   (b) between 20 and 34% by weight of sulphate,
   (c) a fluorine proportion from fluoride and/or (semi)metal fluoro complexes of between 0.1 and 3% by weight, and
   (d) a magnesium silicate stabiliser,
   based in each case on the total weight of the aqueous mixture.

2. The Accelerator according to claim 1, wherein sepiolite is present in the mixture as the stabiliser.

3. The Accelerator according to claim 1, wherein the mixture contains (e) amine.

4. The Accelerator according to claim 3, wherein at least one alkanolamine is present in the mixture as the amine (e).

5. The Accelerator according to claim 3, wherein diethanolamine and/or triethanolamine are present in the mixture as the amine.

6. The Accelerator according to claim 1, wherein the mixture contains:
   (a) between 5 and 9% by weight of aluminium in oxidation state 3,
   (b) between 24 and 32% by weight of sulphate, and
   (c) a fluorine proportion from fluoride and/or (semi)metal fluoro complexes of between 0.1 and 2% by weight,
   based in each case on the total weight of the aqueous mixture.

7. The Accelerator according to claim 1, wherein the mixture contains:
   (a) between 6 and 8% by weight of aluminium in oxidation state 3, (b) between 27 and 30% by weight of sulphate, and (c) a fluorine proportion from fluoride and/or (semi)metal fluoro complexes of between 0.2 and 0.5% by weight,
   based in each case on the total weight of the aqueous mixture.

8. The Accelerator according to claim 1, wherein the mixture contains
   (d) between 0.1 and 10% by weight of magnesium silicate, and
   (e) between 0 and 20% by weight of amine,
   based in each case on the total weight of the aqueous mixture.

9. The Accelerator according to claim 1, wherein the molar ratio of aluminium to sulphate in the mixture is between 1.3:1 and 0.7:1 and the accelerator contains between 24 and 40% by weight of aluminium sulphate, based on the total weight of the aqueous mixture.

10. The Accelerator according to claim 1, wherein the proportion by weight of fluorine from fluoride and/or (semi)metal fluoro complexes in the aqueous mixture is between 0.1 and 1% by weight.

11. The Accelerator according to claim 1, wherein the mixture is present in the form of a dispersion or a suspension.

12. A Process for coating of substrates comprising spraying a substrate with sprayed concrete or sprayed mortar containing an accelerator according to claim 1.

13. Concrete containing an accelerator according to claim 1.

14. Hardened layer which was produced by applying concrete or mortar, the hardening of which was forced with an accelerator according to claim 1.

15. Process for the preparation of an accelerator which is present as an aqueous mixture, wherein
   (i) aluminium sulphate,
   (ii) aluminium hydroxide,
   (iii) hydrofluoric acid and/or fluoride-containing salts and/or (semi)metal fluoro complexes and
   (iv) magnesium silicate are mixed with water,
   wherein the mixture contains:
   (a) between 4 and 10% by weight of aluminium in oxidation state 3,
   (b) between 20 and 34% by weight of sulphate, and
   (c) a fluorine proportion of between 0.1 and 3% by weight, based in each case on the total weight of the aqueous mixture.

16. The Process according to claim 15, wherein the aqueous mixture prepared comprises:
   (a) aluminium in oxidation state 3,
   (b) sulphate,
   (c) fluoride and/or (semi)metal fluoro complexes, and
   (d) stabiliser a magnesium silicate stabiliser.

17. The Process according to claim 15, wherein
   between 28 and 38% by weight of aluminium sulphate, based on the total weight of the accelerator,
   between 2 and 8% by weight of aluminium hydroxide, based on the total weight of the accelerator,
   between 0.2 and 3% by weight of magnesium silicate, based on the total weight of the accelerator, and
   between 0.1 and 2% by weight of fluorine or fluoride from a fluorine-containing substance selected from at least one of the group consisting of hydrofluoric acid, fluoride-containing salts, and (semi)metal fluoro complexes, based on the total weight of the accelerator, are mixed with water.

18. The Process according to claim 15, wherein
   between 32 and 36% by weight of aluminium sulphate,
   between 3 and 6% by weight of aluminium hydroxide,
   between 0.3 and 1.3% by weight of $Si_{12}Mg_8O_{30}(OH)_4(OH)_4 \cdot 8(H_2O)$ and/or $Mg_4Si_6O_{15}(OH)_2 \cdot 6(h_2O)$, and
   between 0.2 and 0.5% by weight of fluorine or fluoride from a fluorine-containing substance selected from at least one of the group consisting of hydrofluoric acid, fluoride- containing salts, and (semi)metal fluoro complexes,
   are mixed with water, the stated weights being based on the total weight of the accelerator.

19. The Process according to claim 15, wherein amorphous aluminium hydroxide is used.

20. Accelerator which is present as an aqueous mixture which contains the following:
   (a) aluminium in oxidation state 3,
   (b) sulphate,
   (c) fluoride and/or (semi)metal fluoro complexes, and
   (d) between 0.1 and 10% by weight of magnesium silicate, and
   (e) between 0 and 20% by weight of amine,
   based in each case on the total weight of the aqueous mixture.

21. A Process for coating of substrates comprising spraying a substrate with sprayed concrete or sprayed mortar containing an accelerator according to claim 20.

22. Concrete containing an accelerator according to claim 20.

23. Hardened layer which was produced by applying concrete or mortar, the hardening of which was forced with an accelerator according to claim 20.

24. Accelerator which is present as an aqueous mixture which contains the following:
   (a) aluminium in oxidation state 3,
   (b) sulphate,
   (c) fluoride and/or (semi)metal fluoro complexes, and
   (d) a magnesium silicate stabiliser,
   based in each case on the total weight of the aqueous mixture, wherein the molar ratio of aluminium to sulphate in the mixture is between 1.3:1 and 0.7:1 and the accelerator contains between 24 and 40% by weight of aluminium sulphate, based on the total weight of the aqueous mixture.

25. A Process for coating of substrates comprising spraying a substrate with sprayed concrete or sprayed mortar containing an accelerator according to claim 24.

26. Concrete containing an accelerator according to claim 24.

27. Hardened layer which was produced by applying concrete or mortar, the hardening of which was forced with an accelerator according to claim 24.

* * * * *